US005167752A

United States Patent [19]

Dowling

[11] Patent Number: 5,167,752

[45] Date of Patent: Dec. 1, 1992

[54] APPARATUS FOR MAKING LAMINATED WEB WITH SPACED REMOVABLE ELEMENTS

[75] Inventor: Michael G. Dowling, Delafield, Wis.

[73] Assignee: CL & D Graphics Inc., Oconomowoc, Wis.

[21] Appl. No.: 606,144

[22] Filed: Oct. 31, 1990

[51] Int. Cl.[5] .............................................. B32B 31/00

[52] U.S. Cl. .................................... 156/512; 156/584; 156/248; 156/267

[58] Field of Search ............... 156/512, 584, 247, 248, 156/267

[56] References Cited

U.S. PATENT DOCUMENTS

| | | | |
|---|---|---|---|
| 3,220,909 | 11/1965 | Kaplan et al. | 156/386 |
| 3,243,331 | 3/1966 | Tobey | 156/477 |
| 3,425,346 | 2/1969 | Voigt et al. | 101/292 |
| 3,574,026 | 4/1971 | Kucheck | 156/152 |
| 3,616,094 | 10/1971 | Navin | 156/571 |
| 3,938,698 | 2/1976 | McDavid, Jr. et al. | 221/73 |
| 3,951,061 | 4/1976 | Bremmer, Jr. et al. | 101/93.12 |
| 4,111,121 | 9/1978 | Borum | 101/227 |
| 4,124,436 | 11/1978 | Pettis, Jr. et al. | 156/542 |
| 4,849,043 | 7/1989 | Instance | 156/247 |

*Primary Examiner*—Robert A. Dawson
*Assistant Examiner*—David Reifsnyder
*Attorney, Agent, or Firm*—Andrus, Sceales, Starke & Sawall

[57] ABSTRACT

Labeling apparatus includes a supply of a laminated webs passing through a die cutter for cutting labels in an outer label member on a web liner. A label repositioner includes a peel bar having four flat surfaces forming four sharp edges. The bar is mounted to locate a flat surface as a support surface for the cut web, which passes downwardly over a guide roller located beneath the plane of the flat surface. The cut web moves over the one sharp edge which releases the label as the liner moves in a loop from the plane of the flat surface. The loop of the liner returns the liner to just below the plane of the flat surface and spaced from the sharp edge by a distance less than the length of the removed label. The removed label passes over the spaced gap and is pressed back onto the liner overlying the die cutting edges on the liner to connect the liner on opposite sides of any cut in the liner.

6 Claims, 2 Drawing Sheets

FIG. 1
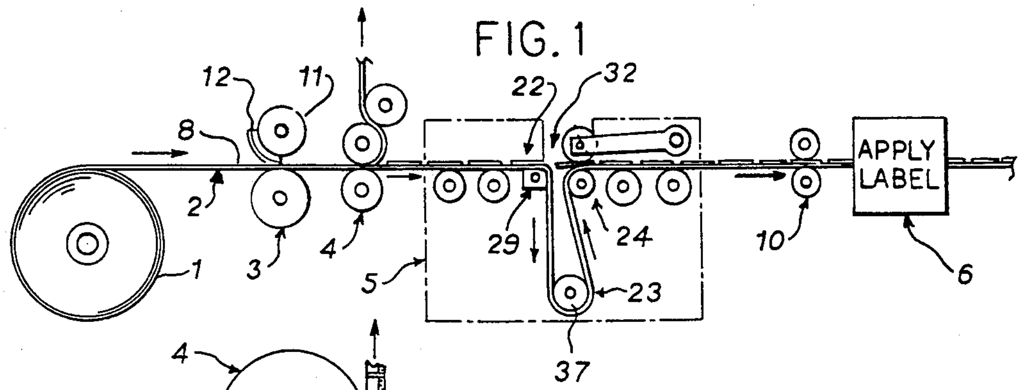
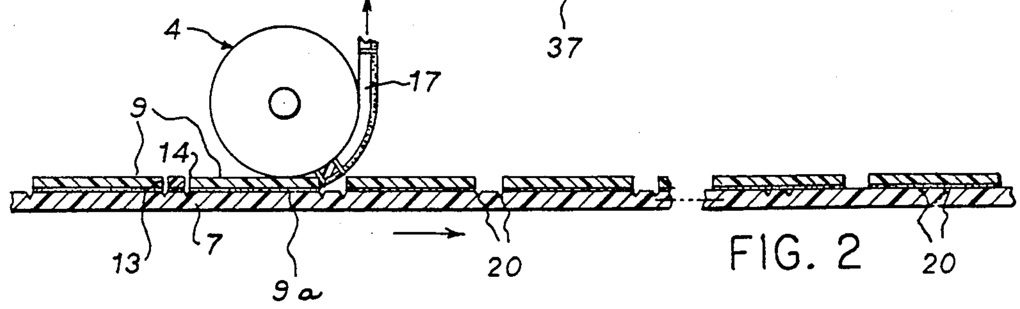
FIG. 2
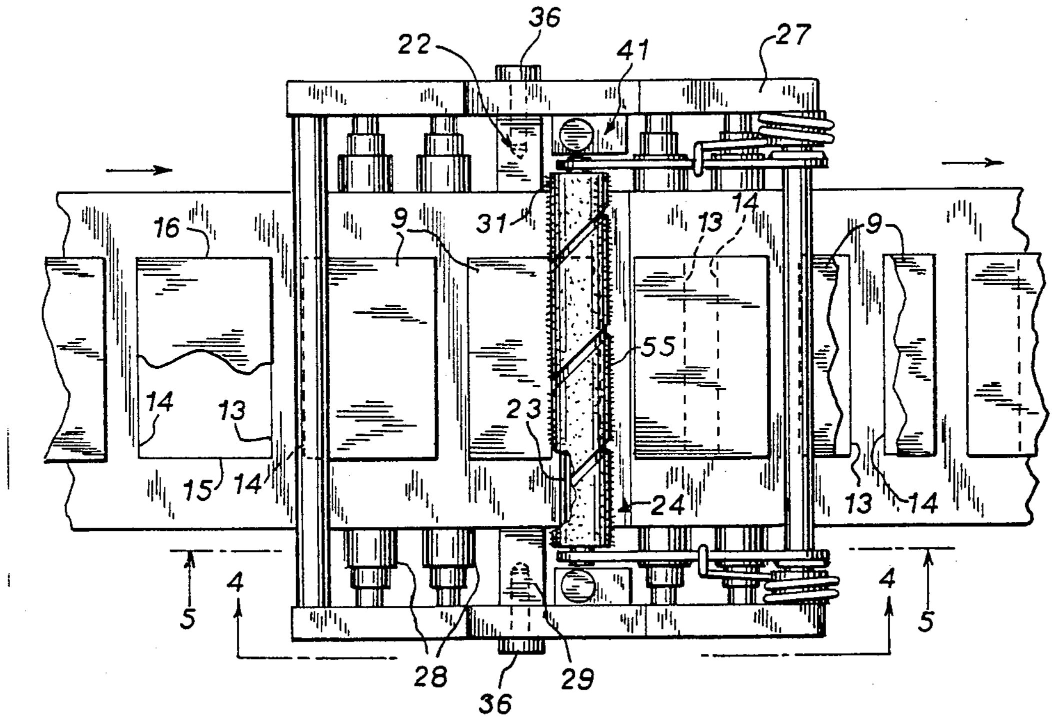
FIG. 3

FIG. 4
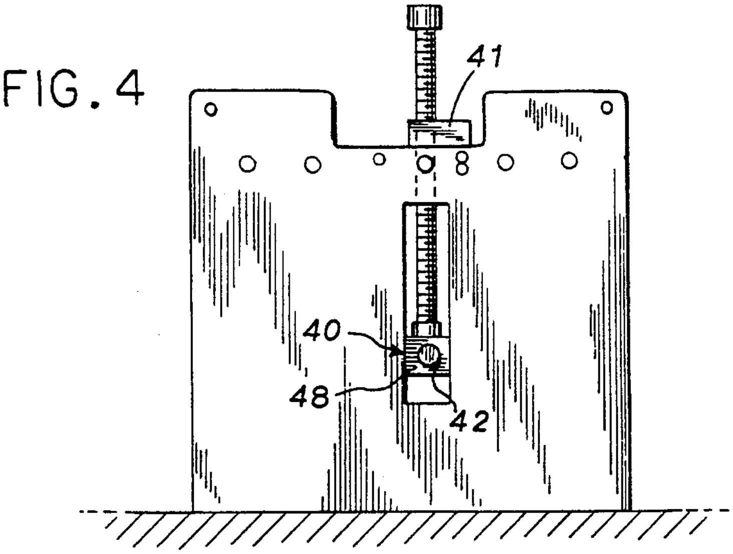
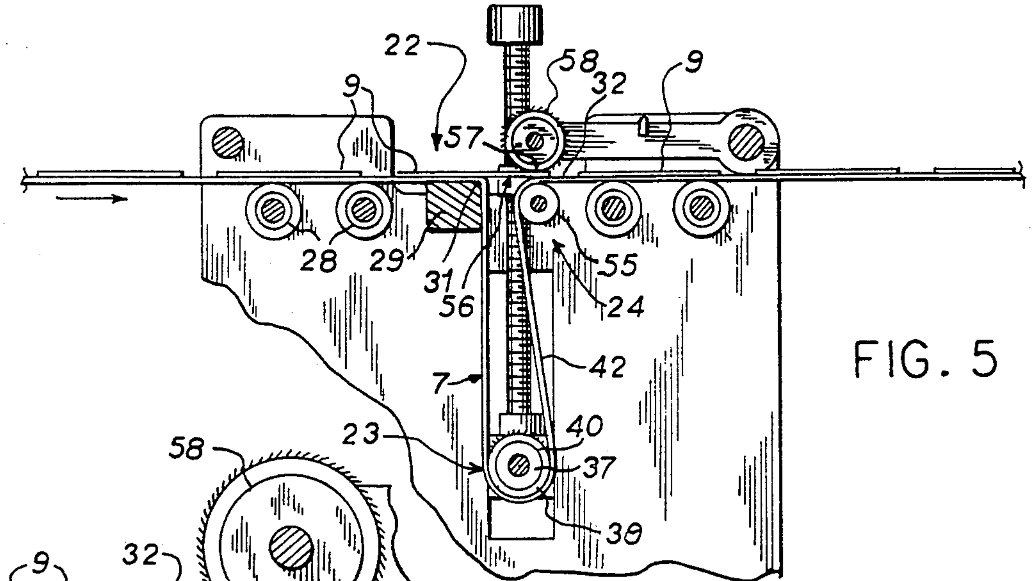
FIG. 5
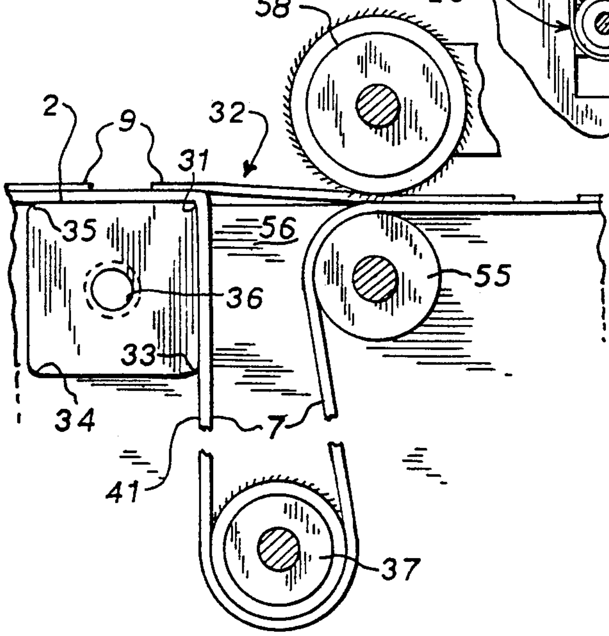
FIG. 6

APPARATUS FOR MAKING LAMINATED WEB WITH SPACED REMOVABLE ELEMENTS

BACKGROUND OF THE PRESENT INVENTION

The present invention is particularly directed to an apparatus for making a laminated web having spaced removable elements such as labels affixed to a base liner and to the method thereof.

Labels and other similar flexible elements are widely used for purposes of identification, information, display and other purposes. A sticky label-like element is often used for application in the production of packaged products and are otherwise sold to end users including retail consumers. In the process of manufacture, a laminated web including a base carrier or liner and a laminated layer of the label-like element material is formed. The laminated web is then passed through a forming line which will generally includes a supply at which a roll or other supply of the laminated web of indefinitive length is located. The web is passed from the supply through a die cutting machine and a trim removal machine which may be formed as a single integrated apparatus to provide the laminated web with the liner carrying the severed and separated elements. The web may then be passed through a label applying machine for application of the label to a suitable container such as a bottle, box or other member, or rewound into a suitable roll in a rewind apparatus. In a conventional system, draw rolls are coupled to the downstream portion of the laminated web and particularly the liner and pull the laminated web through the various machines in the line. The web is maintained under an appropriate tension to provide proper timed movement of the laminated web through the various devices or machines to establish accurate forming and location of the removble elements. Such apparatus is well known and widely used in the packaging, labeling of products and manufacture of products. The die cutting apparatus often includes a reciprocating or rotating die which provides repetitive precise cutting of the outer label layer. As a practical matter, the die cutting apparatus may, at times, move through the removable element material and actually nick the liner, thereby creating a weak spot in the liner. With the event of high speed processing lines, the tension on the web is such that the nicked liner may be so weakened as to break as the laminated web is passed down through the line. Breakage of the web results in the necessity for complete shut down of the line, the removal of the broken web and rethreading of the laminated web through the line from the supply to the rewind apparatus. This is time consuming and results in a significant loss as well as inconvenience in production.

The prior art has recognized the problem associated with a damaged liner. U.S. Pat. No. 3,574,026 which issued Apr. 6, 1971 particularly discusses the problem and notes the difficulties generated by a nicked and thereby weakened liner. The patent discloses a method of separating the laminated web, forming the cut and then reassembling the laminated web. This requires special complex apparatus for both separating and cutting the label or element layer of the laminated.

The prior art apparatus can be conveniently placed in a standard label forming line or the like which includes the usual rotary die cutting machine.

There is a need therefore for a cost-effective apparatus for processing a continuous laminated web with a cut outer layer and a liner in which to detect a potential break in the liner and provide appropriate apparatus to remove the weakened portion from the web so as to permit the continuous high speed processing.

SUMMARY OF THE PRESENT INVENTION

Automated in-line processing of a laminated web includes repositioning of a removable element from a web carrier or liner which has passed through a forming apparatus such as a cutting apparatus to cut the removable article from a web layer, with the removable element repositioned onto a possible weakened portion or area such that the element forms a physical interconnection of the liner to the opposite sides of the weakened area or portion; thereby effectively eliminating the weakened portion in the liner and permitting a continued normal tensioned processing of the laminated web. Generally in accordance with one embodiment of this invention, the cut and trimmed web is passed through an element repositioning apparatus which automatically removes the element from the liner and redeposits the removed element onto a downstream portion of the liner. The liner with the element removed and the removed element move in relatively offset paths to relocate the liner with the weakened portion aligned with an intermediate portion of the removed element. Thus, the liner downstream of the removed element is conveniently passed through a loop path and then returned directly to an in-line position with the removed element for reapplication thereof overlying the border of a preceding element. Generally, the in-line length of the element longitudinally of the web is significantly longer than the spaced cutting edges and consequently can be accuratly replaced to overlie the severed edge portions and the lateral cut or weakened portion.

More particularly in a practical commercial embodiment of the present invention, a label repositioning apparatus for in-line processing of a laminated web including cut-in labels on an outer layer included a label removing bar in the form of a plate-like member or bar having a sharp downstream edge. The liner is passed over the sharp edge, moving longitudinally down and across the edge into a repositioning loop, with the downstream end of the web passing back into the plane of the bar in close spaced relation to the sharp edge. The sharp edge results in the movement of the liner with the label removed and with the label moving generally in the plane of the bar and into overlying relationship to the downstream repositioned liner. The length of the repositioning loop is selected such that the portion of the downstream label-free liner is positioned with the label border, and thus any lateral nicks or cuts, aligned with an intermediate portion of the removed label passed from the bar. Suitable apparatus is provided to insure the reattachment of the label onto the aligned portion of the liner at the end of the loop, without the necessity for any particular monitoring apparatus or the like.

Depending upon the stiffness and characteristic of the label material, the inventor has found that the efficiency and reliability of the label removal is effected somewhat by the sharpness of the label removing edge. The removal bar is preferably formed as a multiple edged member such as a rectangular, triangular or other multiple edge member which is mounted within a support to allow repositioning with anyone of the flat faces and related edge located as the removing edge. The edges may be formed with different degrees of sharpness to match the edge to the label material.

The label-free liner is passed around a suitable guide roller, which may include a bristle-like cover. The roller rotates at approximately the speed of the liner and guides the liner into a return path. The bristle-covered roller has been found to provide a reliable guide for the liner without creating adverse adhesive buildup on the liner. This allows a continuous, effective and reliable high speed processing of the laminated web through the downstream processing apparatus.

In a practical construction, the guide roller is further mounted for adjustable vertical orientation with respect to the plane of the cutting edge to thereby permit the readjustment and spacing of the loop for accurate positioning of the label on the label free liner.

In a high reliable and effective repositioning apparatus, the label-free liner is longitudinally aligned with the laminated web in a plane just beneath the plane of the removal edge of the bar such that the removed label positively moves over the label-free liner and tends to drop downwardly over the label free liner. A roller or other pressure applicator is applied to the removed label and the aligned label-free liner to positively releasably reattach the removed label to the liner.

The present invention has been found to provide a reliable and cost effective apparatus for effectively eliminating any and all weakened areas in a laminated liner as a result of die cutting or the like of an outer layer or member.

BRIEF DESCRIPTION OF THE DRAWINGS

The drawings furnished herewith generally illustrate the best mode presently contemplated for carrying out the invention and are described hereinafter.

In the drawings:

FIG. 1 is a diagrammatic side elevational view of an apparatus for processing a laminated web to form a liner with longitudinally spaced releasable elements;

FIG. 2 is a sectional view of a portion of the laminated web shown in FIG. 1;

FIG. 3 is an enlarged top elevational view of a label repositioning apparatus diagrammatically illustrated in FIG. 1;

FIG. 4 is a side view of the apparatus shown in FIG. 3;

FIG. 5 is a vertical section taken generally on line 5—5 of FIG. 3, and more clearly illustrating detail of construction of the label repositioning apparatus; and FIG. 6 is a fragmentary enlarged view of a label release bar and label transfer section shown in FIGS. 1–5.

DESCRIPTION OF THE ILLUSTRATED EMBODIMENT

Referring to the drawings and particularly to FIGS. 1 and 2, a label forming and applying line is illustrated including a supply roll 1 of a laminated web 2 mounted at the upstream end of the line and forming a supply of the material. The outer free end of the laminated web 2 is threaded through various in-line equipment including a die cutting apparatus 3, a trim removal apparatus 4, a label-repositioning apparatus 5 and a label applying apparatus 6.

As shown most clearly in FIG. 2, the present invention is particularly directed to processing a web 2 having a base or liner 7 of indefinite length with a continuous outer layer or member 8 from which a plurality of longitudinally spaced labels or other similar elements 9, hereinafter referred to as a label 9, are formed. A suitable releasable adhesive **9*a* on the backside of the member 8 and therefore labels 9 releasably hold the labels to the liner 7. The label 9 can then be removed for use in the automatic applying apparatus 6** or otherwise.

Sets of draw rolls 10 are shown pulling the web 2 from supply 1 and through the line with an essentially constant tension. The laminated web 2 is passed through the die cutting apparatus 3 to sever the outer label member 8 to define and form each label 9. Typically, a rotating drum 11 includes a removable die plate 12 secured to the drum face and having a cutting blade **12*a* conforming to the shape of label 9 within the member 8. The drum 11 rotates in timed relation to the speed of the web to thereby sever the member 8 along spaced lateral lines 13 and 14 and connecting longitudinal lines 15 and 16**.

The cut laminated web 2 passes through the trim removal apparatus 4 within which the trim 17 is removed. Trim 17 is that portion of member 8 which encloses each illustrated label 9 as the result of cutting the member 8 within the side edges of the web 2, and is longitudinally continous. Apparatus 4 may include any suitable device such as a pin roll member 18 to strip the trim and continuously remove and deliver the trim to a waste receiver, not shown.

The formed laminated web 2 may have a liner, with nicks or cuts 20 on the label edges 13–16, inclusive, as a result of the die cutting process. The longitudinally extended nicks or cuts in longitudinal edges 15 and 16 of liner 7 do not adversely weaken the liner 7 in the direction of the tension forces and thus do not interfere with the continued movement of the web. The nicks or cuts 20 in the lateral edges 13 and 14 do create weakened and tear locations in the liner 7, and the tension in the formed laminated web 2 does often break the liner 7 with costly disruption of the line 1.

In accordance with the present invention, the formed laminated web 2 is passed through the label-repositioning apparatus 5 within which each label 9 is removed from liner 7 and then reattached in longitudinal offset relationship into overlying relationship to the upstream lateral edges 13 and 14 of adjacent labels 9 on the liner 7, as shown at 21 in FIGS. 2 and 3. Generally in the illustrated embodiment of the invention, a label removal section 22 is located at the upstream end of the apparatus 5. The label 9 is freed from liner 7 at the section 22. The label-free liner 7 is diverted through an offset guide 23 and returned to a label reattachment section 24, at which the label 9 is again affixed to liner 7 overlying the lateral nick or cut or cuts 20 immediately upstream of the label 9.

The successive labels 9 are thus removed, shifted and then relaminated or applied to the liner 7 to cover each edge 13 and 14 to positively cover any nicked or cut liner area and thereby permit reliable, continuous processing of the liminated web 2.

More particularly, the label repositioning apparatus generally includes a means for momentarily separating of the label 9 from the liner 7 and repositioning of the label 9 onto the liner 7 in overlying relation to an area of the lateral cutting line of either the leading edge, downstream edge or both of a preceding label or labels, thereby overlying any nick or cut 20 created by the die cutting apparatus on the front or back edge. The repositioned label 9 adhesively interconnects the two areas of the liner 7 to the longitudinally opposite sides of the cut or nick 0 and thereby joins the liner and effectively removes the weakened area at the cut lines 20. By repositioning of each label approximately one half the width of the labels 9, the reapplied label covers the trailing edge 14 of one label 9 and the leading edge 13 of the next label, to thereby continuously overly such areas of possible weakness.

The present invention is particularly directed to a method and apparatus to eliminate breakage of a formed web, and a preferred and practical embodiment is illustrated in FIGS. 3–5 and more fully described below. The other apparatus of line 1 may be any known or other suitable design and construction, can readily be provided using commerically available apparatus and otherwise be provided by those skilled in the art, and is not therefore further described herein other than as necessary to fully describe the present invention.

More particularly, the label repositioning apparatus 5 includes a side frames 27 forming a supporting structure for the sections 22, 23 and 24. The label removing section 22 includes an infeed bed or peel plate structure including spaced support rollers 28 over which the web 2 is passed with the liner moving in a flat plane. The rollers 28 establish a low friction support for the high speed web. A label release bar 29 is secured immediately adjacent to the downstream end of the rollers and is secured in place between the structure 27 with a flat top wall 30 in the plane of the web 2. The bar 29 is thus located with the upper surface or wall in a common plane with the infeed rollers 28 and with its downstream edge 31 defining an essentially 90° turning point for the web 2. The web 2 moves on the edge 31 into the guide section 23. As the liner 7 moves over the edge 31, the label 9 releases from liner 7 and moves in a relative straight path as a continuation of the plane of the top wall 30 of bar 29, as shown at 32 in FIG. 5. The release action varies with the liner and label materials and the sharpness of edge 31.

The bar 29, as shown most clearly in cross section in FIGS. 5 and 6, has a rectangular cross section and includes three additional relatively sharp corners or edges 33, 34 and 35. The roundness or sharpness of each of the four edges 31, 33, 34 and 35 is slightly different and varies from a maximum radius to an essentially zero radius edge. The release bar 29 is mounted at the opposite ends in a suitable releasable support 36 which are rigidly affixed in place to the side frame structure 27 and supports the bar 29 in fixed relation and in the desired spaced relation to the infeed rollers 28. The bar 29 is mounted locating a selected bar wall and label-release edge in the web plane for optimum release of the label 9 as the web 2 moves over the edge 31 into the diverting guide unit 23. Although shown as a rectangular bar 29, the multi-edge bar may be of other configurations, such as a triangular member or other shape providing one or more sharp release edges. A fixed single release edge plate may of course also be used.

Unit 23 includes a guide roller 37, rotatably mounted in overlying relationship to the laminated web 2 at the release bar 29. The illustrated roller 37 is shown as an outer bristle surface or cover 38 secured to a supporting core unit 39. The opposite ends of the core unit 39 are rotatably mounted to the side frames in suitable low friction bearings 40 and 41. The bristle cover 38 of the guide roller 37 is operative to engage the surface of the cut laminated web liner 7 to stablize the movement of the web through the in-feed end of the repositioning apparatus 4 and provide for smooth turning and transfer of the cut laminated liner through the diverting path or guide 23 with formation of a loop 42 in the label-free liner 7. A simple smooth, metal roller of aluminum or other suitable material without any special cover or outer surface may be used, depending upon the characteristic of the liner and particularly the slip characteristic.

The bristle surface or cover 38 of the loop roller 37 engage the adhesive release surface of the label-free liner 7, and cleans the surface to prevent build-up of adhesive on the liner. Roller 38 is suitably mounted for vertical adjustment in bearing 40 to vary the alignment of the label-free liner and the removed label. In the illustrated embodiment, the opposite ends of the core 39 include shafts 42 which are journalled in similar bearing units 40 and 41 mounted within the side frames 27. Each of the bearings units 40 and 41 is similarly mounted.

The mounting for each bearing unit is identical and the unit 40 is described in detail with the opposite unit having its elements identified by corresponding primed numbers for simplicity and clarity of description.

Referring particularly to FIGS. 3–5, unit 40 is shown mounted in a movable slide block 47 for vertical adjustment of the bearing unit 40 and thereby loop roller 37. The slide block 47 is a substantially rectangular block with is slidably mounted in a vertical guideway 49 in the frame 27 for precise parallel movement with respect to the movement of the web 2. Thus, the axis of the roller 38 moves in a true vertical plane with respect to the movement of the web 2. A threaded shaft 49 is rotatably fixed to the top edge of the block and projects upwardly with the upper end threaded into a non-rotating nut unit 50. The nut unit 50 is fixed to the side frame 27. A common rotating drive unit, not shown, may be secured to the shafts 49 for the respective bearing units 40 and 41 to provide simultaneous and corresponding positioning of the bearings and thereby maintain the roller in precise parallelism with respect to the plane of the web as it moves through the loop about the roller.

The web 2 thus is looped downwardly and then upwardly in a fixed loop with the downstream end relocated within the reapplying section 24 to receive the free label 32. The liner 7 is located in a plane in the reapplying section 24 corresponding generally, to the plane of the in-feed rollers, the release bar 29 and particularly a free label 32, which has just been removed from the liner 7 and passes generally in the straight line motion from the bar 29.

The label reapplying section 24 includes a suitable return roller 55 rotatably mounted in slightly downstream relation to the release bar 29 to define a short gap 56 over which the free label 21 passes in unsupported relation in the illustrated embodiment. A desired suitable support structure, not shown, can be interposed to bridge the gap although applicant has not found it necessary, and such could be undesirable as the adhesive side of the free label moves over the gap and any surface provided in the gap 56.

The roller 55 which engages the underside of the liner 7 can be of any suitable construction which will allow the smooth and appropriate turning of the liner into a generally planar relationship with respect to the underside of the incoming free label 32. The turn roller 55 is rotatably journaled at its opposite ends in suitable bearings, not shown, to allow the free movement of the tensioned web liner 7 through the label repositioning apparatus 5 and particularly section 24.

As shown most clearly in FIG. 6, the uppermost plane 57 of the turning roller 55 is shown spaced slightly below the upper plane of the label releasing bar 29. This relationship provides for a slight dropping of the free label 32 moving across the gap 56 and into engagement with the repositioned liner. To positively and reliably and maintain the label 32 applied to the liner 7, a downward force unit is preferably provided to firmly apply the label onto the liner, and a relatively low force pressure is applied so as to insure the reliable and positive reapplication of the label to the liner for subsequent processing. In the illustrated embodiment, a roller 58 is again used to firmly apply the free label 32 to the liner 7, with the label 32 reorientation bridging any lateral nick or cut 20 in lateral edges 13 and 14 on the liner 7 which has been created as a result of the cutting of the label, as by the illustrated die cutting apparatus. Although illustrated as a bristle covered roller as shown in the preferred embodiment, a smooth or other special surfaced roller of metal or other material may also be used within the broadest aspect of the present invention.

The discharge end of the label repositioning apparatus may be provided with a suitable support to establish the planar movement of the relabeled liner downstream into the label applying apparatus 6 or any other suitable apparatus, such as a rewind apparatus, connected in line with the upstream devices or apparatus.

The illustrated embodiment has been found to provide a highly reliable and effective element repositioning apparatus. In a typical application, the web moves at a 300 feet per minute and with the web under a typical tension of four pounds per linear inch width (PLI). Although the illustrated embodiment is shown with many preferred features, the present invention is basically broadly directed to the method and apparatus for removing a label from a laminated web carrying a series of labels or like elements which have been cut into laminated webs on the label and the web liner passes through relatively different length paths or at a different speed and back into a common path with the free label specially moved relative to its original position so as to reposition the free label bridging a possible weakened area or location on the liner and thereby effectively and operatively eliminate the weakened area from the liner. The turning bar with the multiple edges provides a particularly versatile unit for processing of different lines and labels. Individual bars or even other label removal systems may be employed within the broad aspects of the invention. Similarly, the bristle rollers and the particular diverting guide assembly or unit, with the adjustable loop, provides a particularly simple reliable and effective relative repositioning of the label and the liner, but may be replaced with any diverting system. Any other suitable realigning method or structures may of course be provided. Within the broadest aspects of the invention, the label itself can be made to be moved through a diverted path so as to realign the label with the liner moving in a continous and generally linear path. Further, the term "label" is used herein to define any removable element formed on a liner which may have weakened on disruptive areas adjacent the removable element and which can be effectively eliminated or minimized by the described moving of the removable element. These as well as other various variations and changes in the illustrated label repositioning apparatus and method can be readily provided by those skilled in the art using the teaching of the present application and various machine technologies and methods.

The present invention provides a highly cost effective and reliable method and apparatus for essentially eliminating the difficulties associated with the nicking and weakening of a liner or the like in a releasable severed laminated web.

Various modes of carrying out the invention are contemplated as being within the scope of the following claims particularly pointing out and distinctly claiming the subject matter which is regarded as the invention.

I claim:

1. An apparatus for forming a laminated label web supply by processing of a laminated web including a continuous support liner and a superimposed label member having an adhesive backing securing the label member to said liner, comprising a cyclically operable cutting apparatus having a cutting apparatus adapted for cutting through said label member to form at least one label during each cycle, said cutting apparatus having cutting tolerances resulting in random and unpredictable interengagement with said liner developing on said upstream and downstream edge cut locations whereby said liner is weakened and subject to separation as a result of tension in said liner, a trim removal unit adapted to be coupled to said label member for removing of the label member from about said label, a repositioning apparatus located in spaced relation to said cutting apparatus and operable to remove a label and reposition said label on said liner, drive means for moving of said laminated web under tension through said cutting apparatus and said trim removal unit and said repositioning apparatus in a continuous manner with said laminated web under tension, said repositioning apparatus including a label removal apparatus for removing of each label from said liner and further including a repositioning unit relatively positioning said label adjacent up and downstream lateral edge cut locations on said liner of succeeding labels, and a label attachment apparatus to apply said repositioned label to said liner whereby said repositioned label is adhesively bonded to said liner to form a connection element interconnecting said liner to the opposite side of each of said lateral edge cut locations and thereby effectively and operatively removing any weakening in said locations as a result of engagement of the cutting unit with said liner.

2. In the apparatus of claim 1 wherein said cutting apparatus is a rotary die cutting apparatus including a rotating drum having a die plate secured to the surface and operable in connection with a backing member to define a cutting gap through which said laminated web passes, and a drive unit connected to said drum which rotates said drum in timed relation to the movement of said laminated web to successively form equispaced labels on said liner.

3. In the apparatus of claim 2 wherein said cutting apparatus includes said trim removal unit operable to engage the label member from about said label immediately downstream of said die plate and operable to continuously remove said label member from about successively formed labels and define a labeled liner.

4. The apparatus of claim 1 wherein said repositioning apparatus includes a label removal unit and a downstream label reapplying unit spaced from said label removal unit defining a gap therebetween, a diverting guide unit located within said gap to move said liner laterally of said gap, said removed label moving from said label removal unit across said gap into spaced overlying alignment into said label reapplying unit, said diverting guide unit relocating said liner with respect to said removed label to align said label with the upstream edge of one label location and with the immediately adjacent downstream cut edge location of the immediately upstream label location on said liner, said label reapplying unit including a pressure unit for positively applying said removed label onto said aligned liner whereby said reapplied label overlies said lateral cut locations.

5. A positioning apparatus for a carrier web having a plurality of longitudinally spaced flexible elements secured by a releasable adhesive to a liner, said liner of said carrier web having equispaced portions between said longitudinally spaced flexible elements and at least some of said equispaced portions having a reduced strength longitudinally of said liner, comprising a release unit having an input end and a discharge end, means for passing said carrier web through said release unit, said release unit including means at said discharge end to remove said flexible elements from said liner and to move said flexible elements through a predetermined path, means transporting said liner from said discharge end in a path different than said predetermined path and to redirect said liner into said predetermined path in spaced relation to said release unit and aligning each of said equispaced portion of said liner with one of said flexible elements, and an attachment unit reattaching said last named flexible elements to said liner in overlying relationship to one of said equispaced portions.

6. A label forming apparatus for forming a series of longitudinally spaced labels on a web liner of indefinite length, comprising a roll having said length of said web liner wound thereon and said web liner having an outer laminate layer, a supply roll support for supporting said roll of said laminated web, draw roll units located downstream of said roll support and coupled to said laminated web for pulling said web from said roll support, a die cutter unit located downstream of said roll support and having cutting means cyclically moving to a cutting position to sever said laminate layer and form a separated removable label with a leading edge and a trailing edge, a label repositioning unit located downstream of said die cutter unit and including a block member having a plurality of planar surfaces terminating in a downstream sharp edge and a first web directing unit located below said sharp edge and a second web directing unit located downstream and generally in the plane of said sharp edge, said second web directing unit being spaced from said sharp edge by a gap having a length less than the length of a label, said laminated web being passed over said block member and said first and second web directing units and pulled through said die cutter unit and said label repositioning unit to remove said label at said sharp edge and immediately move the label through said gap and onto said liner passing over said second web directing unit, and said gap and said second web directing unit being constructed and arranged to locate said label overlying said leading edge and trailing edge.

* * * * *